United States Patent [19]

Andersen et al.

[11] 4,158,701
[45] Jun. 19, 1979

[54] PYROHYDROLYSIS SYSTEM FOR PROCESSING FLUORINE-CONTAINING SPENT AND WASTE MATERIALS

[75] Inventors: John N. Andersen, Moraga; Norman Bell, Livermore, both of Calif.

[73] Assignee: Kaiser Aluminum & Chemical Corporation, Oakland, Calif.

[21] Appl. No.: 958,061

[22] Filed: Nov. 6, 1978

[51] Int. Cl.² ........................... C01F 7/04; C01B 7/22
[52] U.S. Cl. ..................................... 423/119; 423/111; 423/133; 423/484; 423/489; 423/DIG. 16
[58] Field of Search ............... 423/111, 119, 484, 133, 423/489, DIG. 16

[56] References Cited

U.S. PATENT DOCUMENTS

| | | | |
|---|---|---|---|
| 3,023,676 | 1/1963 | Mollard et al. | 423/484 |
| 3,635,408 | 1/1972 | Williams | 204/294 |
| 4,006,066 | 2/1977 | Sparwald | 204/67 |
| 4,065,551 | 12/1977 | Dahl | 423/484 |
| 4,113,832 | 9/1978 | Bell et al. | 423/119 |

Primary Examiner—Herbert T. Carter
Attorney, Agent, or Firm—Paul E. Calrow; Andrew E. Barlay

[57] ABSTRACT

A pyrohydrolysis system is provided for the recovery of valuable components from waste and spent materials generated in electrolytic aluminum reduction facilities. The pyrohydrolysis system employs a dense phase fluidized bed reaction zone for the pyrohydrolysis of coarse feed, a dilute phase fluidized reaction zone for pyrohydrolyzing fine feed, this zone being superimposed and interconnected with the dense phase zone. The offgases, after removal of the solids, are contacted in a dilute phase fluidized zone, with a source of $Al_2O_3$ to remove residual Na values and to produce Na-free HF. The solids from the first dilute zone, having a desired high Na:Al atom ratio, can be combined with the product clinker from the dense bed zone. The offgas, containing the source of $Al_2O_3$, is subjected to solids separation, the solids-free and Na-free HF is utilized, while the solids of low Na:Al mole ratio are recycled to the residual Na conversion step.

4 Claims, 2 Drawing Figures

PYROHYDROLYSIS SYSTEM FOR PROCESSING FLUORINE-CONTAINING SPENT AND WASTE MATERIALS

BACKGROUND OF THE INVENTION

This invention relates to an improved pyrohydrolysis process for the recovery of fluorine, sodium and aluminum values from spent and waste materials of electrolytic aluminum reduction systems.

More particularly, the present invention provides an improved pyrohydrolysis system for processing without agglomeration both the coarse and fine materials generated in the feed preparation step which precedes pyrohydrolysis with simultaneous reduction in the dust carry-over and minimization of backreactions during the course of pyrohydrolysis.

It is known that pyrohydrolysis of the spent and waste materials of electrolytic aluminum reduction systems results in the recovery of aluminum, sodium and fluorine values. Thus, U.S. Pat. No. 4,113,832 (N. Bell et al) describes a fluidized bed process wherein the spent and waste materials, such as spent potlinings, channel and trench cleanings, as well as spent alumina from dry scrubber systems, are processed in a pyrohydrolysis unit and as a result of pyrohydrolysis sodium fluoride, aluminum fluoride, HF and sodium aluminate clinker are recovered. As shown in this patent, the fine fraction of less than 1-2 mm in size, which is generated in the comminuting stage of pyrohydrolysis feed preparation, is subjected to a shaping step in order to avoid introduction of excessively fine materials in the reactor. The fine materials, unless agglomerated, can provide difficult operating conditions in the reactor and can also generate dust separation problems in the equipment associated with the pyrohydrolysis reactor. Thus, for efficient and well-controlled operation of the pyrohydrolysis process in the fluidized bed reactor of this patent, agglomeration of the finely divided feed material is a requirement.

In copending applications Ser. No. 910,416 (May 30, 1978), an improved process for pyrohydrolyzing the spent and waste materials of electrolytic aluminum reduction systems is disclosed. In accordance with the process shown in this copending application, the pyrohydrolysis process is controlled in such a manner as to eliminate the carry-over of sodium fluoride in the offgas recovery system, thus producing essentially only HF, which can be recovered as such or employed for the manufacture of a high grade aluminum fluoride ($>90\%$ $AlF_3$ content). To achieve the conversion of the NaF constituent of the pyrohydrolysis offgass to HF, the process disclosed in Ser. No. 910,416 employs a two-stage fluidized bed reactor. In the first stage, the feed is charged to the reactor bottom portion, where it is fluidized and simultaneously pyrohydrolyzed by introduction of water. The generated offgases, containing steam, volatilized fluorine and sodium values, are then contacted in the reactor freeboard area with a finely divided source of $Al_2O_3$. This contact in essence provides an "extended" reaction zone or second stage where conversion of the volatilized sodium values to the desired HF and sodium aluminate ($Na_2O.xAl_2O_3$) takes place. From the "extended" zone, the offgas is conducted through a dust separation and recovery system, the dust- and essentially NaF-free HF is further processed, while the recovered dust is partly reintroduced into the "extended" zone and partly recycled to the feed preparation stage for utilization of its unreacted alumina content. Since the particle size of the finely divided source of alumina is generally selected to be less than 1 mm for several reasons, including provision for reactive surface, any material recycled to the feed preparation stage is too small for direct charging to the fluidization zone. Consequently, any alumina source recycled to the feed preparation stage has to be agglomerated, preferably together with the fine fraction of the comminuted spent and waste materials.

Thus, it can be seen that the recovery of valuable components from spent and waste materials of electrolytic aluminum reduction systems by pyrohydrolysis in the prior art methods involved an agglomeration step of the finely divided feed materials. This agglomeration step, due to the great variety of feed materials and their differing physical behavior under known agglomeration conditions, poses a serious technical problem, aside from the costly and time-consuming nature of agglomeration operations.

The present invention is directed to the elimination of the previously required agglomeration operation and at the same time it provides a process in which the sodium to aluminum ratio in the clinker can be readily controlled under conditions which assure conversion of the volatilized sodium values to the desired HF with practically no backreaction occuring. These aims are achieved by providing a staged pyrohydrolysis process wherein the coarse fraction of the comminuted feed is charged to a dense phase fluidized reaction zone of the reactor together with a portion of the fines, the remaining fine fraction of the feed is introduced in the area above the dense bed of the reactor, where it becomes fluidized in a dilute phase and the volatile reaction products from both of these stages are then reacted with a finely divided source of alumina in a third stage, comprising a dilute phase fluidized bed reactor, to convert residual sodium values to HF and $Na_2O.xAl_2O_3$. From the first dilute phase reactor, e.g., the second stage, the dust-containing offgases prior to being charged to the third stage are subjected to a dust separation step and a major portion of the recovered dust is recycled to the second stage, and the residue of the dust is combined with the clinker exiting from the dense phase bed. The offgas from the third stage, e.g., the second dilute phase fluidized bed reactor, are subjected to dust separation. The essentially dust-free gas is used for HF recovery, while a major portion of the collected dust is recycled to the third stage and the remaining portion is charged to the first dilute phase bed. Addition of this material, having relatively low sodium to aluminum ratio, to the first dilute phase bed in a controlled amount, allows control of the final sodium to aluminum ratio in the produced clinker. The novel combination of these operational steps provides a pyrohydrolysis process wherein the clinker has a controlled Na:Al mole ratio to assure optimum leachability; a minimized dust load in the offgas leaving for HF utilization, as well as an essentially Na-free HF content.

BRIEF SUMMARY OF THE INVENTION

A pyrohydrolysis process is provided for the recovery of fluorine, sodium and aluminum values from spent and waste materials generated in electrolytic aluminum reduction facilities. The spent and waste materials are comminuted and then classified into coarse and fine fractions. The coarse fraction, with a portion of the fine fraction, is charged to a dense phase fluidized reaction zone where it is pyrohydrolyzed. The liberated volatile fluorine and sodium-containing compounds are conducted into a first dilute phase reaction zone, into which the balance of the fine fraction is also introduced. In this zone additional fluorine and sodium values are liberated by pyrohydrolysis and formation of solid $Na_2O.xAl_2O_3$ is achieved. The offgas from this zone, containing the residual volatilized fluorine and sodium values, as well as solid $Na_2O.xAl_2O_3$ product, is subjected to solids-gas separation and the solids-free offgas is then contacted in a second dilute phase fluidized reaction zone with a finely divided source of $Al_2O_3$ for conversion of residual sodium values to HF. This conversion is conducted at a low Na:Al mole ratio in the solids to assure recovery of an offgas essentially free of unconverted sodium values. After the contact in the second dilute phase fluidized reaction zone, the offgas is separated from entrained solids and is used for HF recovery, while the solids are recycled to the reaction zone until their Na:Al mole ratio increases to a predetermined limit. The desired ratio is then maintained by adding fresh source of $Al_2O_3$ and by removing an equal portion from the recycle stream. This purge stream is charged to the first dilute phase reaction zone, where its Na to Al mole ratio is allowed to increase to form a desirable $Na_2O.xAl_2O_3$ end product.

DETAILED DESCRIPTION OF THE INVENTION

Figure 1:
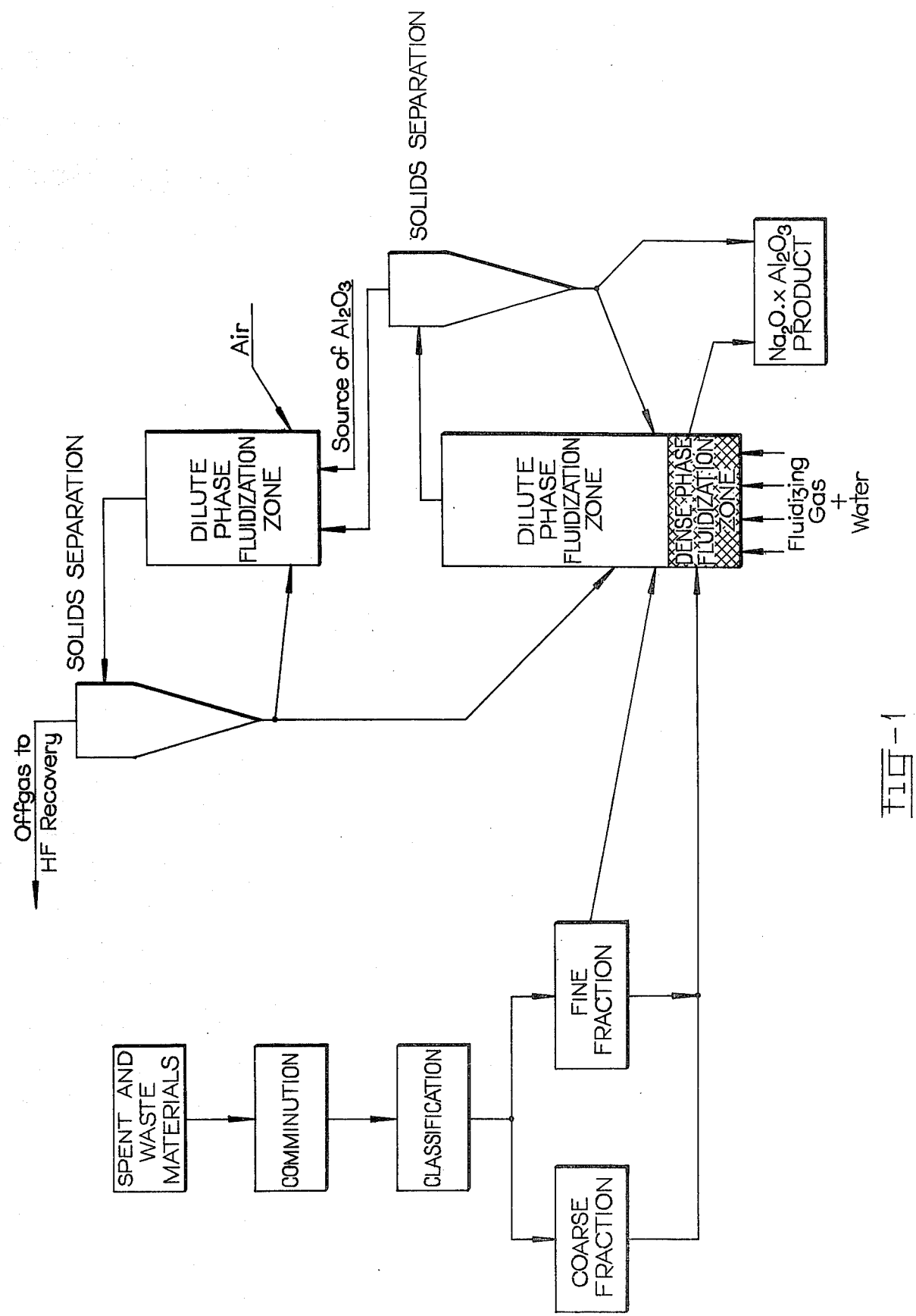
FIG. 1 schematically shows the operation of the pyrohydrolysis system, wherein coarse feed in admixture of fines is charged into a dense phase fluidized bed, the rest of the finely divided feed is fed into a dilute phase fluidized bed located above the dense phase. The offgases, after dust removal, are contacted with a finely divided source of alumina in a second dilute phase fluidized bed to convert residual sodium values to $Na_2O.xAl_2O_3$, followed by solids separation and recovery of the HF content of the offgas.

This invention relates to a pyrohydrolysis system for processing fluorine-containing spent and waste materials generated in electrolytic aluminum reduction processes. For the purposes of this invention the term "spent and waste materials" as used herein refers to spent aluminum reduction cell- or potlinings, channel and trench cleanings, floor sweepings and also spent alumina recovered from dry scrubbers which are employed for offgas purification in the reduction facilities. All of these materials contain fluorine values and most of them also contain significant quantities of carbon. A detailed description of these spent and waste materials is provided in U.S. Pat. No. 4,113,832, the disclosure of this patent, relative to the characterization of the spent and waste materials, is made a part of the instant specification by reference.

In the system of the present invention both "dense phase" and "dilute phase" or "expanded" bed reactors are employed. Dense phase fluidized bed reactors are well-known in the art and are conventionally employed for many years for calcination or decomposition of chemical compounds. Dense phase fluidized beds are generally characterized by a more or less definable surface and the quantity of solids being fluidized in the bed is generally high relative to the velocity of gases used for fluidization. In contrast, in "dilute phase" or "expanded" fluidized bed reactors the ratio of solids to fluidizing gas velocities is low, thus providing a fluidization zone which does not possess a definable surface. Since "dilute phase" or "expanded" fluidized bed reactors are also known in the art, further description of these reactors is not provided; however, attention is directed to pages 58-63 of Chemical Engineering Progress, Volume 67, No. 2, where a detailed description of these reactors is provided by L. Reh.

In order for ready understanding of the instant invention the operation of the pyrohydrolysis system will be explained in detail with reference to FIG. 1. Since the spent and waste materials generated in the electrolytic aluminum reduction facilities are of diverse nature and size, it is necessary to provide a feed to pyrohydrolysis having particles within certain size limits. For operation of a dense fluidized bed it has been found that the particles should be not less than about 1 mm in size and preferably in the range of about 1.3 to 5 mm. In order to obtain this preferred size, the spent and waste materials must be comminuted, for example by crushing and/or grinding. Comminuting operations almost always result in the generation of fines, e.g. particles having a size below about 1 mm. Consequently, in the present process the spent and waste materials are subjected to a comminuting step and then the comminuted material is subjected to a classification step to provide a coarse fraction having particles in the 1.3 to 5 mm range and fines having a smaller size. Any particles having sizes above the desired range are recycled to the comminuting step. The coarse fraction, as shown in the Figure, is then charged to the fluidized bed reactor together with a portion of the fines for fluidization and pyrohydrolysis of the charge. Fluidization is accomplished by the introduction of fluidizing gases at a predetermined rate which will provide the required fluidity to the bed. Since the spent and waste materials from the electrolytic aluminum reduction process contain a significant quantity of carbon, combustion of this carbon content aids in providing the necessary heat energy for fluidization. Since pyrohydrolysis of the fluoridic constituents of the spent and waste materials, hereinafter referred to as "feed" or "charge," takes place above about 900° C., the temperature in the dense fluidized bed is established at this temperature, preferably to be within the range of about 1000°-1300° C. At these temperatures, in the presence of $H_2O$, the following reactions take place:

$2AlF_3 + 3H_2O \rightleftharpoons Al_2O + 6HF$ (1)

$NaF(l) \rightleftharpoons NaF(g)$ (2)

$NaF(g) + H_2O \rightleftharpoons NaOH(g) + HF$ (3)

$2NaOH(g) + xAl_2O_3 \rightleftharpoons Na_2O.xAl_2O_3 + H_2O$ (4)

It can be observed that reactions (2)-(3) result in volatile sodium-containing products, while reaction (4) results in solid sodium aluminate clinker. It is known that sodium aluminate can have varying Na:Al ratios which affect its water-solubility. In order to assure that the clinker, e.g., the end product of reaction (4), possesses optimum solubility in water, the Na:Al mole ratio in the feed should be kept within the limits of about 0.7–1.0.

The pyrohydrolysis of the charge in the dense fluidized bed results in the formation of volatilized NaF, HF and NaOH and solid sodium aluminate clinker. The clinker is removed from the reactor and utilized, for example in the Bayer process for alumina production by leaching. The volatilized reaction products with some of the fines will be carried to the first dilute phase zone of the reactor where reactions between these products continue.

In accordance with the novel system of the invention a large portion of the fine feed fraction, obtained in the classification step, is introduced in the dilute phase zone of the reactor. Since the quantity of fines produced in the comminuting step is generally more than the amount of coarse material, the conditions for having "dilute" phase fluidization and pyrohydrolysis reactions in this zone of the reactor can be readily established. Thus, by introducing a relatively large portion of the fines in this "expanded" reaction area in an amount defined by the conditions required by a dilute phase fluidization reactor, pyrohydrolysis of the fines, in accordance with reactions (1)–(4) as shown, takes place.

For reasons to be explained hereinafter, it is advantageous to conduct the pyrohydrolysis of the fine fraction in the dilute phase zone under reducing conditions. This can be readily accomplished by combusting the carbon content of the charge at a slight oxygen deficiency, which results in a combustion offgas containing some carbon monoxide as well as hydrogen. If the combustion of the carbon content of the fine fraction under the desired degree of reducing conditions still results in temperatures above the desired limit, cooling of the expanded zone can be accomplished by introduction of, for example, $H_2O$.

Charging of the fine feed into the dilute reaction zone will provide an offgas, which among the desired gaseous reaction products will also entrain a substantial quantity of solids. These solids contain a sodium aluminate product of relatively high Na to Al mole ratio, which assures the water solubility of this product. Consequently, it is advantageous to remove this product from the offgas prior to the conversion of the residual sodium compounds, e.g., NaOH, to $Na_2O.xAl_2O_3$. Removal of the solids content is conveniently accomplished by the use of a conventional solids-gas separating unit, for example in a cyclone. A portion of the solids recovered in the separation step is combined with the clinker product, a major portion thereof is recycled to the dilute phase of the pyrohydrolysis reactor.

The dust-free offgas is then introduced into a third reaction zone, which conveniently is maintained also as a dilute phase fluidization reactor. This dilute phase reactor zone is utilized for the conversion of residual sodium-containing compounds of the offgas to HF. Conversion of these compounds is achieved by the introduction of an $Al_2O_3$ source, such as bauxite or $Al_2O_3.xH_2O$, where the value of x can vary between 0.3–3.0. Mixtures of bauxite with $Al_2O_3xH_2O$ can also be used as well as mixtures of $Al_2O_3$ compounds of varying x values. The particle size of the $Al_2O_3$ is selected to be small in order to provide a surface capable of rapid reaction with the sodium values. The size is kept generally at 40–500 microns. The quantity of alumina source added in this reaction zone is selected to be in a range so as to provide a clinker product from the first dilute phase zone having an Na to Al mole ratio within the limits of 0.7–1.0. This will result in an Na to Al mole ratio in this zone within the limits of about 0.3 to 0.6. This accomplishes the desired conversion in accordance with reaction (4) shown above.

Since introduction of the source of $Al_2O_3$ in this zone as well as convection and radiation heat losses may reduce the temperature of the reactor below the desired limit which can result in backreactions, steps are to be taken to assure the proper temperature conditions in this reaction zone. As mentioned hereinbefore, the operation of the first dilute or expanded fluidized bed reaction zone can be accomplished under reducing conditions. Consequently, the offgas introduced into the second dilute phase reactor, e.g., the third reaction zone, will contain CO and $H_2$. Introduction of oxygen-containing gas to this reaction zone completes combustion of the CO to $CO_2$ and $H_2$ to $H_2O$ thus providing exothermic conditions and sufficient heat to maintain the reaction temperature within the desired limits. It is to be understood that the above described temperature control method is provided only as one of the many means capable of achieving the desired temperature control throughout the reactor system, other means can be equally applied and the invention is not intended to be limited by the method of control described.

The offgas emanating from this third stage reactor is now essentially free of residual sodium compounds and could be employed for the recovery of its HF content but for the solids content of the offgas. The solids, which as mentioned before, consist of an $Na_2O.xAl_2O_3$ compound of low Na to $Al_2O_3$ ratio, are suitably removed from the offgas by conventional solids-gas separating means, such as a cyclone. To avoid the possibility of backreactions in the separation stage, it is recommended to accomplish separation at temperatures substantially equal to those utilized in the third stage reactor zone.

The solids collected are continuously recycled to the third reaction zone. Also, a bleed stream is removed from the recycle stream and introduced in the second reaction zone corresponding to the first dilute fluidization stage. The amount removed by purging is then replaced with fresh source of $Al_2O_3$. It is to be understood that purging from the recycle stream can be continuous or semi-continuous and the same applies to the replacement of the purged quantity.

Figure 2:
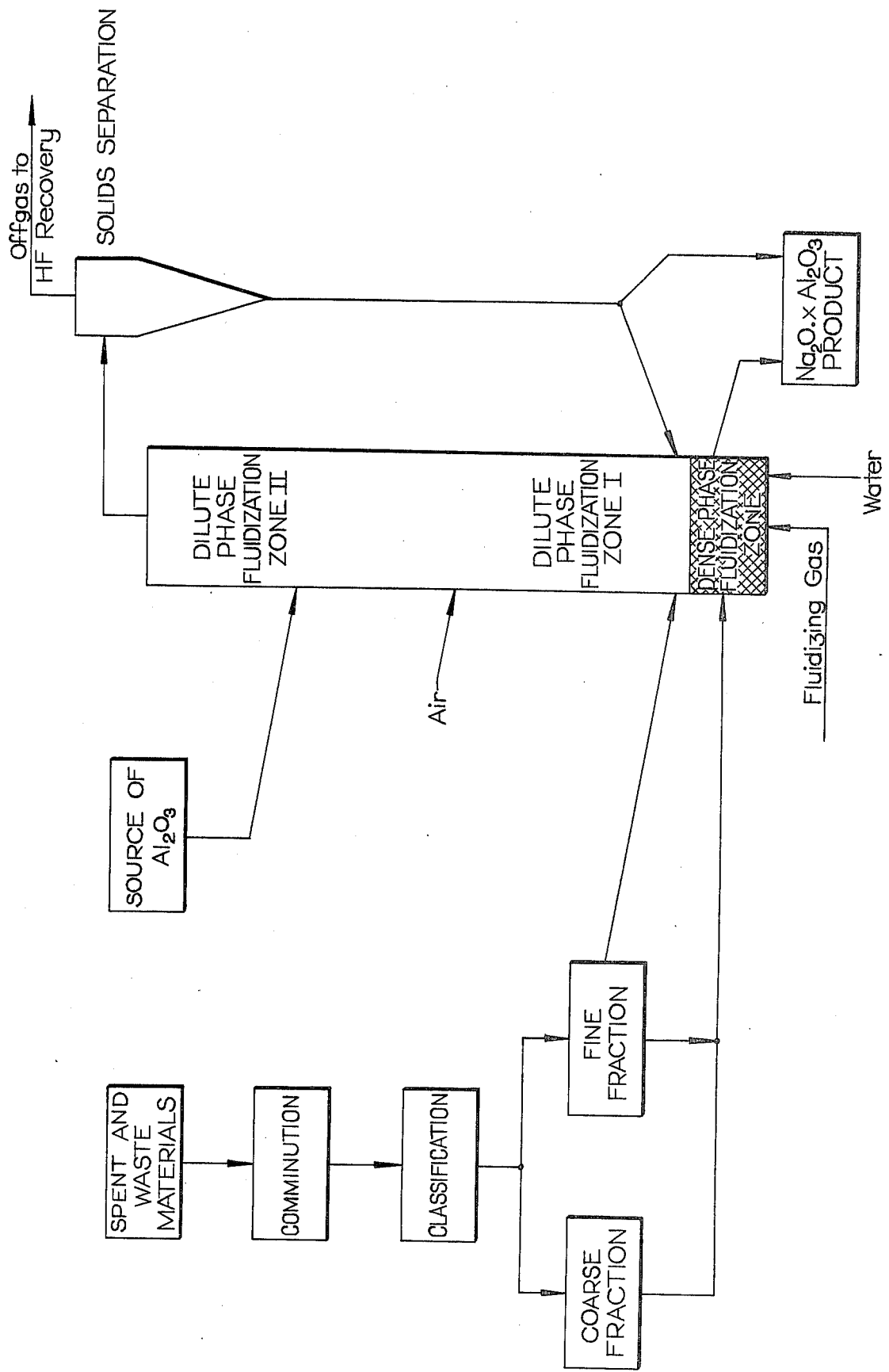
FIG. 2 schematically shows a single pyrohydrolysis reactor having a dense phase fluidized bed reaction zone at its bottom portion, and two superimposed, distinct, but interconnected and interacting dilute phase reaction zones above the dense phase bed.

While the invention has been described in detail with regard to FIG. 1 showing two reactions, it is to be clearly understood that the instant pyrohydrolysis system can employ a single reactor wherein the reaction zones or stages are in superimposed relationship in accordance with the scheme shown in FIG. 2.

The following example is intended to further explain the novel aspects of the instant pyrohydrolysis system. In this example, the data given is an adaptation of experimental and calculated results to a scaled-up pyrohydrolysis plant of commercial size.

EXAMPLE

Spent aluminum reduction cell lining having the composition shown in Table I was subjected to pyrohydrolysis in a system according to the present invention. The pyrohydrolysis system employed for the recovery of HF and sodium aluminate from the spent lining comprised a single reactor having a dense phase fluidized bed and in the freeboard area above the dense phase bed an expanded or dilute fluidized bed was maintained. A separate, dilute phase fluidizing furnace was used for the contacting of the offgases from the single reactor with the finely divided source of alumina.

Table I

| Composition of Spent Reduction Cell Lining | |
|---|---|
| Element | % by Weight |
| F | 13.1 |
| Al | 14.8 |
| Na | 15.0 |
| C | 29.5 |
| Ca | 1.3 |
| Fe | 0.7 |
| Si | 0.7 |
| Oxygen and Minor Constituents | Balance |
| Na:Al Mole Ratio | 1.19 |

The spent lining was crushed and then classified into coarse and fine fractions. The coarse fraction having a particle size within the range of 1.4 to 2.4 mm (8×14 mesh) constituted about 30% of the crushed spent lining, while the fine fraction consisting of particles of less than about 1 mm in size comprised about 70% by weight of the total.

Both the coarse and fine fractions were analyzed prior to pyrohydrolysis and the results of the analysis are shown in Table II.

Table II

| Composition of Crushed and Classified Spent Lining | | |
|---|---|---|
| | % by Weight | |
| Element | Coarse Fraction | Fine Fraction |
| F | 9.8 | 14.5 |
| Al | 16.4 | 14.1 |
| Na | 19.0 | 13.3 |
| C | 35.3 | 27.0 |
| Na:Al Mole Ratio | 1.36 | 1.11 |

The desired overall heat balance in the pyrohydrolysis system was established by controlling the total feed charge to the system at about 4000 kg/hr. For proper fluidization conditions, a fluidizing gas input of 247 scm/min. (standard cubic meter/minute) was maintained. The temperature in the dense phase fluidized bed was kept at about 1200° C. The feed rate of coarse fraction to this reaction zone was maintained at 1200 kg/h. The coarse fraction charged to this dense phase zone was mixed with 1520 kg/h fines; thus, the total feed to the dense phase bed amounted to 2720 kg/h. The carbon content of this mixture was sufficient to provide the energy release for maintaining this zone at 1200° C. The remainder of the fines was charged to the first dilute phase fluidizing zone at the rate of 1280 kg/h. In order to maintain the desired temperature (1200° C.) in the dilute phase reaction zone, 5,000,000 Btu/h heat input was provided to counterbalance the radiation and convection losses and to satisfy the sensible heat load of the fine feed, as well as to compensate for the heat losses due to the solids recycle loop connected to the dilute phase reaction zone.

Control of the rate of heat input to the dilute phase reaction zone was accomplished by limiting the oxygen level available for carbon combustion. The fluidizing gas composition introduced to the dense phase reaction zone was as follows: $N_2$ 152 scm/min., $O_2$ 33 scm/min., $H_2O$ 55 scm/min. and $CO_2$ 7 scm/min. By limiting the oxygen content of the gas entering from the dense phase reaction zone to the dilute phase zone, the combustion of the fine fraction's carbon content was incomplete resulting in formation of carbon monoxide and hydrogen and reducing conditions in the first dilute phase reaction zone.

The combination of coarse and fine materials fed to the dense phase fluidization zone resulted in an Na:Al mole ratio of 1.23 indicating an excess of Na. Fluidization of this combined charge generated an Na-rich gas consisting of NaF and NaOH, while the relatively long residence time of the combined charge in the dense phase reaction zone provided a clinker product having an Na:Al mole ratio of 0.9, indicating the formation of a well-leachable solid product. The offgas leaving the dense phase bed and entering the dilute phase reaction zone contained 2.0 scm/min. NaF and NaOH vapors.

In addition to the offgases entering the dilute phase zone the residual fines (1280 kg/h) were also introduced into this zone in close vicinity of the surface of the dense bed. Extended contact between the vapors and the fines in the presence of steam in this dilute phase reaction zone permitted the formation of a solid $Na_2O.xAl_2O_3$ product having an Na:Al mole ratio of about 0.9.

The offgas from this dilute phase reaction zone, containing the entrained solids, was then conducted to a cyclone where separation of the solids from the gas took place. The solids, containing sodium aluminate having an Na:Al mole ratio of 0.9, were combined with the clinker from the dense phase reaction zone, while the offgas, containing 1.0 scm/min. NaF+NaOH in vapor form, was introduced into a second dilute phase reaction zone. In this reaction zone, the offgas was contacted with a finely divided alumina source consisting of bauxite of about 56% by weight $Al_2O_3$ content (determined after heating it to 1000° C. for 1 hour). The particle size of the bauxite charged to this zone was kept at about 100–200 microns. In order to compensate for the heat sink effect of the bauxite addition, as well as for heat losses due to radiation and convection, air at the rate of 19 scm/min. was charged to this dilute phase zone. The oxygen content of the air was sufficient to cause complete combustion of the CO and $H_2$ constituent of the offgas, resulting in the generation of about 3,300,000 Btu/h heat energy. This was essentially equal to the heat energy input required for the maintenance of the reaction zone temperature at the desired 1200° C. Heat balance throughout the entire pyrohydrolysis system was controlled by a microprocessor which sensed the temperature conditions in each reaction zone and allowed instantaneous adjustments as required.

In the third reaction zone, e.g., the second dilute phase reaction zone, the Na to Al mole ratio was kept at a nearly constant value of about 0.4 by the addition of sufficient $Al_2O_3$ in the form of bauxite. This allowed the formation of a more stable $Na_2O.xAl_2O_3$ species which exhibit a lower equilibrium vapor pressure and provided for the reduction of the NaOH vapor pressure in the offgas to such a degree that after separation of the entrained solids from the offgas, the solids-free offgas contained only 0.2 scm/h Na-containing vapor corresponding to a 98% conversion of the total sodium content of the entire cell lining charge to valuable sodium aluminate product.

The solids recovered from the solids separation means connected after the second dilute phase reaction zone were recycled to this second zone. A portion of the recovered solids was charged to the first dilute phase zone. A corresponding quantity of $Al_2O_3$ in the form of bauxite was charged to the second dilute phase reaction zone in order to maintain the desired Na:Al mole ratio in the reaction zone. By introduction of the source of Al$_2$O$_3$ in the second dilute phase reaction zone, it was possible to maintain the Na to Al mole ratio in the clinker product at the desired 0.7–1.0 value.

Tables III and IV provide the material balance for the pyrohydrolysis process accomplished in the instant system.

Table III

| | Pyrohydrolysis Reactor Feed | | | | | |
|---|---|---|---|---|---|---|
| Location and Type | Feed in Kg/Hr | | | | | |
| | F | Al | Na | C | Inerts | Total |
| Coarse Fraction to Dense Phase | 118 | 197 | 228 | 424 | 233 | 1200 |
| Fine Fraction to Dense Phase | 220 | 214 | 202 | 410 | 474 | 1520 |
| Fine Fraction to 1st Dilute Phase | 186 | 180 | 170 | 346 | 398 | 1280 |
| Bauxite to 2nd Dilute Phase | — | 192 | — | — | 228 | 420 |
| Total | 524 | 783 | 600 | 1180 | 1333 | 4420 |

Table IV

| | Solids Recovery from Pyrohydrolysis | | | | | |
|---|---|---|---|---|---|---|
| Location | Recovery in Kg/Hour | | | | | |
| | F | Al | Na | C | Inerts | Total |
| Clinker from Dense Phase | 2.4 | 197 | 147 | — | 233 | 579 |
| Clinker from 1st Dilute Phase | 8.1 | 586 | 441 | — | 1100 | 2135 |
| Total | 10.5 | 783 | 588 | — | 1333 | 2714 |

The results shown in Tables III and IV clearly indicate the efficient nature of the instant pyrohydrolysis system wherein high conversion rates are obtained relative to fluorine recovery and elimination of undesired sodium-containing compounds from the HF-containing offgas. Although the invention has been described in great detail, it is to be clearly understood that various changes, alterations and modifications can be made thereto without departing from the spirit and scope thereof as defined in the appended claims.

What is claimed is:

1. A pyrohydrolysis process for the recovery of fluorine, aluminum and sodium values from spent and waste materials generated in electrolytic aluminum reduction facilities which comprises:
   (a) comminuting the spent and waste materials and classifying the comminuted materials by size into coarse and fine fractions, wherein the coarse fraction consists of particles having a size in the range of about 1.3 to 5 mm and the fine fraction consists of particles of less than about 1 mm;
   (b) providing a pyrohydrolysis reactor having a dense phase fluidized reaction zone and superimposed thereon at least one dilute phase fluidized reaction zone;
   (c) charging to the dense phase fluidized zone a feed consisting of a mixture of the coarse fraction and a portion of the fine fraction and subjecting this feed in the dense phase fluidized zone to pyrohydrolysis in the temperature range of about 900° C. and 1300° C. in the presence of steam to generate an offgas containing HF and volatile sodium-containing reaction products which enter from the dense phase zone the superimposed dilute phase fluidized zone and a solid Na$_2$O.$x$Al$_2$O$_3$ clinker which is removed from the bed;
   (d) charging to the first dilute phase fluidized zone as feed the residual fine fraction and subjecting this fraction to pyrohydrolysis in the presence of the volatiles from the dense phase zone and steam to form additional HF and volatile sodium-containing compounds in the offgas and solid Na$_2$O.$x$Al$_2$O$_3$ product;
   (e) controlling the Na to Al mole ratio in both the dense and first dilute phase reaction zones between the limits of about 0.7 to 1.0;
   (f) separating the solid product from the offgas and introducing the solids-free offgas containing the HF and volatile sodium-containing reaction products into a second dilute phase fluidized zone where it is contacted with a finely divided source of Al$_2$O$_3$ having a particle size in the range of about 40 to 500 microns, the quantity of Al$_2$O$_3$ source being controlled so as to obtain an Na:Al mole ratio in the reaction zone within the limits of about 0.3 and 0.6, the source of Al$_2$O$_3$ being introduced to this zone to essentially complete conversion of the volatile sodium-containing compounds to HF and solid Na$_2$O.$x$Al$_2$O$_3$;
   (g) separating the solids from the essentially sodium compound-free HF-containing offgas and recovering the HF from the offgas.

2. Process of claim 1, wherein both dilute phase fluidized reaction zones are located in a single pyrohydrolysis reactor in a superimposed and interconnected relationship.

3. Process of claim 1, wherein the dense phase reaction zone and the first dilute phase reaction zone employed for pyrohydrolysis of the fine fraction are located in a single reactor and the second dilute phase reaction zone employed for conversion of the residual volatile sodium-containing compounds to HF and Na$_2$O.$x$Al$_2$O$_3$ is located in a separate reactor.

4. Process according to claim 1, wherein the temperature in the second dilute phase reaction zone is controlled by carrying out the pyrohydrolysis in the first dilute phase reaction zone under reducing conditions to form CO and H$_2$ and combusting the CO and H$_2$ in the second dilute phase reaction zone in the presence of oxygen to generate heat sufficient to maintain the desired reaction temperature in the second dilute phase reaction zone.

* * * * *